United States Patent [19]

Suzuki

[11] Patent Number: 5,327,536
[45] Date of Patent: Jul. 5, 1994

[54] MICROPROCESSOR HAVING BRANCH PREDICTION FUNCTION

[75] Inventor: Nariko Suzuki, Tokyo, Japan

[73] Assignee: NEC Corporation, Tokyo, Japan

[21] Appl. No.: 704,297

[22] Filed: May 22, 1991

[30] Foreign Application Priority Data

May 22, 1990 [JP] Japan .................................. 2-131812

[51] Int. Cl.$^5$ .............................................. G06F 9/26
[52] U.S. Cl. ..................... 395/375; 395/800;
364/DIG. 1; 364/261.3; 364/263.1; 364/261.7
[58] Field of Search ....................... 395/800, 425, 375

[56] References Cited

U.S. PATENT DOCUMENTS

| | | | |
|---|---|---|---|
| 4,725,947 | 2/1988 | Shonai et al. | 395/375 |
| 4,894,772 | 1/1990 | Langendorf | 395/375 |
| 4,943,908 | 7/1990 | Emma et al. | 395/375 |
| 4,984,154 | 1/1991 | Hanatani et al. | 395/375 |
| 5,093,778 | 3/1992 | Favor et al. | 395/375 |
| 5,185,869 | 2/1993 | Suzuki et al. | 395/375 |

Primary Examiner—Alyssa H. Bowler
Assistant Examiner—L. Donaghue
Attorney, Agent, or Firm—Whitham & Marhoefer

[57] ABSTRACT

A microprocessor which prefetches instructions in words which contain a fixed plurality of bytes based on addresses which disregard one or more less significant bits and in which instructions comprises a variable number of bytes includes an adder for supplying information regarding the starting location for each instruction within a multi-byte, prefetched word held in a queue for alignment of the instruction for decoding by an instruction decoder. Upon the occurrence of an unconditional branch instruction or a conditional branch instruction in which the condition is met, a multiplexer is used to substitute a starting location stored in a branch hit table for the branch target instruction within a multi-byte, prefetched word for the starting for the starting location developed by the adder. Prefetching is performed by incrementing addresses by a number corresponding to the number of less significant bits disregarded in the addresses and accessing a branch prediction table and also the branch hit table when a branching instruction is encountered. An acknowledgement of a prefetch is then used to serialize prefetching of the word containing the start location of the branch target. If the branch target is also a branch instruction, this serialization allows repetition of the prefetch through a number of branching instructions limited only by the capacity of the branch hit table and disturbance of pipelined processing is thereby reduced.

8 Claims, 6 Drawing Sheets

| Instruction | Address | Mnemonic | Operation | Byte Length |
|---|---|---|---|---|
| 1 | A1 | MOV. R1, R2 | (R1→R2) | 3 |
| 2 | A2 | INC. R3 | (R3+1) | 2 |
| 3 | A3 | Br. A1 | (Branch to A1) | 2 |
| ⋮ | | | | |
| 10 | A10 | Br. A2 | (Branch to A2) | 2 |
| ⋮ | | | | |
| 20 | A20 | MOV. #0123H, R4 | (0123H→R4) | 7 |
| 21 | A21 | ADD. R4, R5 | (R4+R5→R5) | 3 |
| 22 | A22 | SUB. R2, R5 | (R5−R2→R5) | 3 |
| ⋮ | | | | |

FIG.3

MICROPROCESSOR HAVING BRANCH PREDICTION FUNCTION

BACKGROUND OF THE INVENTION

The present invention relates to a microprocessor and, more particularly, to a pipelined microprocessor having a branch prediction function.

An instruction prefetch function and a pipelined processing function are widely used to enhance the program execution efficiency of a microprocessor. However, when the microprocessor encounters a unconditional or conditional branch instruction, the execution efficiency thereof are often lowered remarkably. This is because the branch instruction changes the instruction stream to be executed, so that the address to be accessed by the instruction prefetch function is changed with suspending the pipelined processing operation.

In order to solve this drawback, therefore, a branch prediction function is provided to the microprocessor. In this function, a branch prediction table is provided to store in pairs an address of a branch instruction and a branch address designated by the branch instruction. When the branch instruction is prefetched, therefore, a branch prediction hit signal is derived from the table. In response to the hit signal, an instruction stored in the branch address, i.e. branch target instruction, is prefetched in place of prefetching instructions succeeding to the branch instruction. The disturbance in the pipelined processing operation is thus prevented or suppressed.

However, the following problem rises in turn in a recent high performance microprocessor. Specifically, a microprocessor performs in general a data processing operation in word units, so that the instruction prefetch operation is also performed in word units. In a recent high performance microprocessor, the bit length of one word is expanded. Assuming that one word is constructed of 32 bits, instruction data is fetched in 4-byte units per one prefetch operation. The fact that the instruction prefetch operation is performed in 4-byte units means that the memory access for prefetching respective instructions is performed with disregarding the less significant two bits (including the least significant bit) of the address. On the other hand, the byte length of respective instructions including the branch target instruction is not constant, but changes depending on the required data processing operation and/or the addressing mode for operand data. For this reason, the leading byte of each instruction is not always coincident with the word boundary. That is, the leading byte of the branch target instruction is often different from the first byte of four bytes fetched in fact by the prefetch operation for the branch target instruction. Accordingly, such information is required that represents which byte of four bytes fetched in fact corresponds to the leading byte of the branch target instruction. Without this information, the decoding operation on the branch target instruction is delayed and disturbs the pipelined processing operation.

Moreover, a recent program has been complicated to comply with a higher level processing operation, and in such a program a branch instruction is often written in the branch address. That is, the branch target instruction may be also a branch instruction for requiring a further branch target instruction. In this case, unless there is information for representing which byte of four bytes fetched in fact by the prefetch operation for the further branch target instruction corresponds to the leading byte of the further branch target instruction, the subsequent instruction prefetch operation and the instruction decoding operation are suspended and disturbs the pipelined processing operation.

SUMMARY OF THE INVENTION

Therefore, an object of the present invention is to provide a microprocessor having an improved branch prediction function.

Another object of the present invention is to provide a microprocessor in which the disturbance in a pipelined processing operation is prevented or suppressed even when a branch target instruction is also a branch instruction.

A microprocessor according to the present invention has a branch prediction function in which an instruction prefetch operation for a branch target instruction responsive to a branch instruction is performed successively to an instruction prefetch operation for the branch instruction and comprises an instruction queue for temporarily storing the prefetched instruction data, an instruction decoder for decoding instruction data supplied thereto, an aligner for supplying a part of the instruction data stored in the instruction queue to the instruction decoder in response to aligning information, a branch hit table including a plurality of buffer areas, each of which stores less significant bit data of address information used for the instruction prefetch operation for the branch target instruction, and aligner control unit responding to the branch instruction being supplied to the instruction decoder to change the content of the aligning information in accordance with data stored in the corresponding buffer area of the branch hit table.

Since the data stored in the buffer area of the branch hit table represents the position of the leading byte of the branch target instruction within the accessed one word, the aligner can control the position of instruction data to be supplied to the decoder such that the leading byte of the branch target instruction corresponds to the first byte of the instruction data supplied in fact to the decoder. Moreover, since the branch hit table includes a plurality of buffer areas, the branch hit occurs successively, the pipelined operation is free from the disturbance.

BRIEF DESCRIPTION OF THE DRAWINGS

The above and other objects, advantages and features of the present invention will be more apparent from the following description taken in conjunction with the accompanying drawings, in which:

FIG. 3 is an instruction stream diagram used for explaining an operation of PFU shown in FIG. 2;

DETAILED DESCRIPTION OF THE PREFERRED EMBODIMENTS

Figure 1:
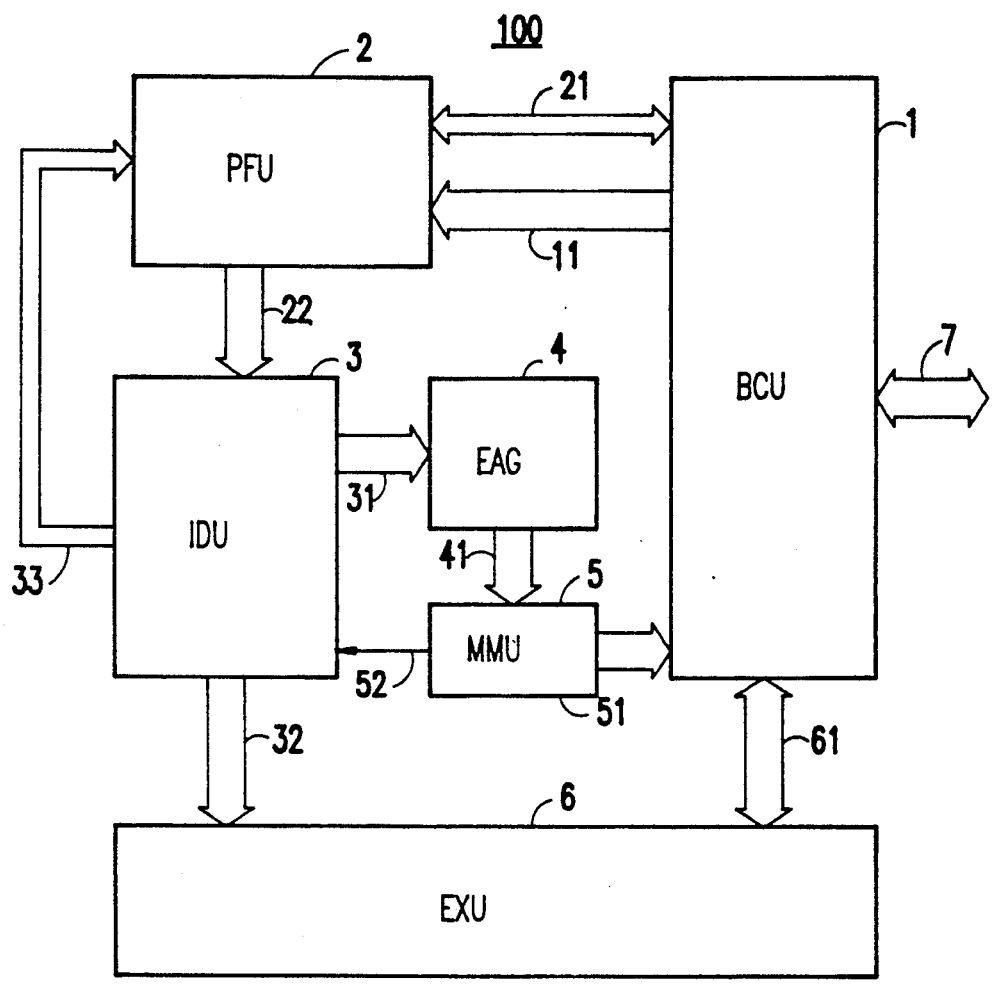
FIG. 1 is a block diagram representative of a microprocessor according to an embodiment of the present invention.

Referring now to FIG. 1, a microprocessor 100 according to an embodiment of the present invention includes a bus control unit (BCU) 1 which initiates bus cycles to a system bus 7 coupled to a memory and peripheral I/O units (not shown) to fetch instruction data and read and write operand data. The instruction data thus fetched are supplied through a bus 11 to an instruction prefetch unit (PFU) 2 and temporarily stored therein. PFU 2 and BCU 1 transfer via a control bus 21 therebetween control data including an instruction prefetch request, an acknowledge signal responsive to the request, address instruction for the instruction prefetch operation and so forth. The instruction from PFU 2 is transferred to an instruction decoder unit (IDU) 3 via a bus 22. IDU 3 decodes the instruction supplied thereto and generates data processing information for executing the instruction, operand access information for accessing operand data and decoded instruction information such as the byte length of the instruction. The data processing information is supplied via a bus 32 to an instruction execution unit (EXU) 6, and the operand access information is supplied via a bus 31 to an effective address generator (EAG) 4. The decoded instruction information is returned to PFU 2. EAG 4 calculates and produces an effective address in response to the operand access information 31 and supplies it to a memory management unit (MMU) 5 via a bus 41. MMU 5 translates the effective address into a real address and then requests an operand access to BCU 1 through a bus 51. MMU 5 further informs IDU 3 of the completion of the address translation through a signal 52. EXU 6 executes the instruction in response to the information from IDU 3 with receiving or supplying operand data from or to BCU 1. The respective units 1 to 6 operate in a pipelined manner.

In the microprocessor 100 of the present embodiment, one word is constructed of 32-bit, i.e., 4-byte. Therefore, the instruction data of 4-byte length are fetched simultaneously by one instruction prefetch operation and then transferred to PFU 2 through the instruction bus 11 of 4-byte length. On the other hand, in a memory storing instruction data and operand data, a unique address is alloted to each one byte data. Accordingly, the fetching of the instruction data of 4-byte length by one prefetch operation means that the memory access is performed by disregarding the contents of the less significant 2 bits (LSB and LSB+1) of the memory address.

Figure 2:
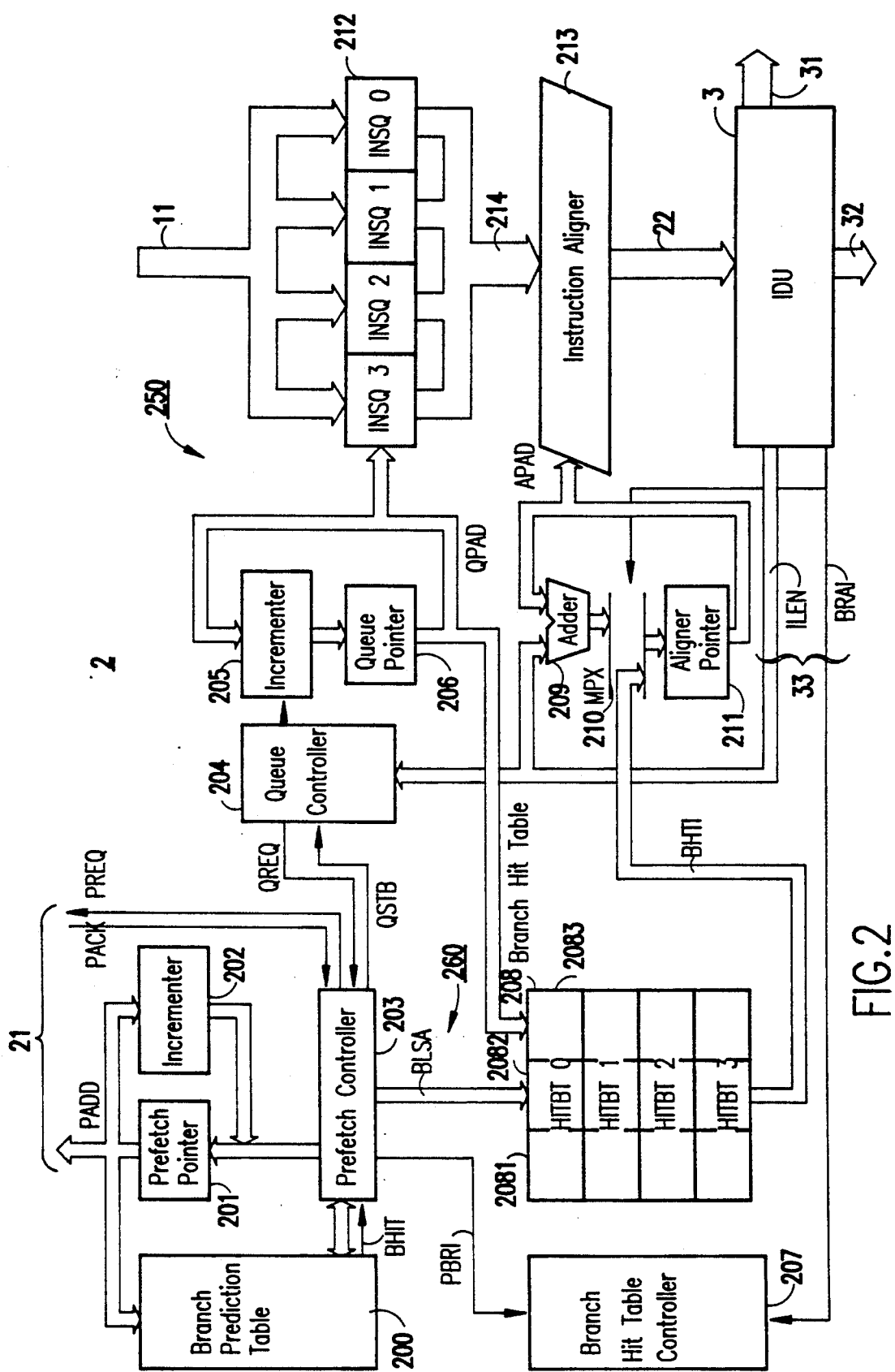
FIG. 2 is an internal block diagram representative of an instruction prefetch unit (PFU) shown in FIG. 1.

Turning to FIG. 2, PFU 2 is composed of an instruction queue section 250 and an instruction prefetch and branch prediction control section 260. The section 250 includes an instruction queue 212 having four pockets INSQ0 to INSQ3. Each of the pockets INSQ0-3 has a 4-byte memory capacity. The bus 11 is coupled in common to the queue pockets INSQ0-3. The 4-byte instruction data on the bus 11 is stored in one of the queue pockets INSQ0-3 selected by queue pointer information QPAD of 2-bit from a queue pointer 206. The information QPAD is updated by an incrementer 205 by one and then restored in the pointer 206. The updating timing of the incrementer 205 is controlled by a queue controller 204 in response to a queue strobe signal QSTB from a prefetch controller 203 of the section 260. The queue controller 204 further responds to instruction length information ILEN, which is of 3-bit and representative of the length of the decoded instruction supplied from IDU 3, and detects whether or not the instruction queue 212 is filled with unexecurted instruction data. When the queue 212 is detected to have vacant pocket(s), the queue controller 204 supplies an instruction request signal QREQ to the prefetch controller 203.

The instruction data stored in the queue pockets INSQ0 to INSQ3 are tied up as instruction data of 16-byte length and then supplied to an instruction aligner 213 via a bus 214. The aligner 207 selects four bytes from the 16-byte instruction data and outputs the selected 4-byte instruction data to IDU3. The position of the leading byte of the 4-byte instruction data to be selected is designated by the aligning pointer information APAD of 4-bit from an aligner pointer 211. Specifically, the byte length of each instruction is not constant, but is changed depending upon the required operation, the number of operand mode and the address mode for each operand data. Therefore, it is required to control the position of the instruction data to be supplied to IDU 3 in accordance with the byte length of the previous instruction. For example, assuming that the previous instruction has a 3-byte length positioning on the first to third byte of the 16-byte data on the bus 214, the leading byte of the next instruction positions on the fourth byte thereof, so that the data from the fourth byte to the seventh byte require to be supplied to IDU 3. This aligning operation is performed by the instruction aligner 213 in response to the aligning pointer information APAD. The information APAD is added by the adder 209 with the content of the instruction-byte information ILEN and then supplied to a first input node of a multiplexer (MPX) 210 having a second input node supplied with branch hit information BHTI from a branch hit table 208 which will be described later in detail. The output of MPX 210 is rewritten into the aligner pointer 211. MPX 210 responds to a branch decoding signal BRAI from IDU 3. The signal BRAT indicates by the high level thereof that IDU 3 is decoding a branch instruction. When the signal BRAI takes the high level, MPX 210 selects the information BHTI. In the case of the low level signal BRAI, MPX 210 selects the output of the adder 209. The information ILEN and the signal BRAI constitute the decoder instruction information 33.

The instruction prefetch and branch prediction section 260 includes a prefetch pointer 201 outputting a prefetch address information PADD for an instruction prefetch operation. The address information PADD is updated by an incrementer 202 by four since 4-byte instruction data are fetched by one prefetch operation. The updated address is then rewritten into the pointer 201. The prefetch address information PADD is further supplied to a branch prediction table 200. This table 200 includes a plurality of storage areas each storing in pairs an address of a branch instruction and branch information under control of the prefetch controller 203. The branch information includes a branch address designated by the branch instruction and the byte length of a branch target instruction stored in the branch address. The prefetch controller 203 responds to the request signal QREQ from the queue controller 204 and supplies a prefetch request signal PREQ to BCU 1 (FIG. 1). BCU 1 transfers the fetched 4-byte instruction onto the bus 11 with returning an acknowledge signal PACK. In response to the signal PACK, the controller 203 supplies the strobe signal QSTB to the queue controller 204.

When the prefetch address PADD is coincident with the address of the branch instruction stored in the table 200, a branch hit signal BHIT is produced by the table 200 and then supplied to the prefetch controller 203. In response to the hit signal BHIT, the controller 203 reads out the corresponding branch address from the table 200 and sets it into the prefetch pointer 201. When the instruction request signal QREQ is in the active level, the prefetch controller 203 produces the prefetch request PREQ with the branch address. The branch target instruction is thus prefetched by BCU 1 after prefetching the branch instruction and then transferred onto the bus 11 with returning the acknowledge signal PACK. In response to the signal PACK, the controller 203 produces a branch target hit signal PBRI together with the strobe signal QSTB. The 4-byte instruction data including at least leading byte of the branch target instruction is thus stored in the instruction queue INSQ designated by the pointer information QPAD. The prefetch controller further produces the contents of less significant two bits (LSB and LSB+1) of the branch address as information BLSA. The branch target hit signal PBRI is supplied to a branch hit table controller 207 controlling a branch hit table 208. This table 208 includes four buffer areas HITBT0 to HITBT3 and stores and outputs information therein and therefrom in a FIFO (First-In First-Out) manner under control of the table controller 207. Each of the buffer areas HITBT0 to HITBT3 has three portions 2081 to 2083, the first portion 2081 of which operates as a valid bit flag set to logic 1 in response to the signal PBRI and reset to logic 0 in response to the signal BRAI and the second portion 2081 of which is supplied with the information BLSA, i.e. the contents of the less significant two bits of the branch address. The third portion 2083 is supplied with the queue pointer information QPAD. The output of the table 2083 is supplied to MPX 210 as branch hit information BHTI to control the aligner pointer 211 and thus the aligning pointer information APAD.

Next, a detailed operation will be described below by way of example of an instruction stream shown in FIG. 3, wherein the first column indicates an instruction; the second column, an address; the third column a mnemonic code; the fourth column, an operation, and the last column, the instruction byte length. In order to facilitate the understanding, assume that the contents of both the pointers 206 and 211 are zero and the prefetch pointer 201 outputs the address A1 of the instruction ①. Also assume that the branch prediction table 200 stores the address A3 of the branch instruction ③, the corresponding branch address A10 in which the additional branch instruction ⑩ is stored, the address A10 of the branch instruction ⑩, and the corresponding branch address A20. Further assume that the leading byte of the instruction ① positioned on the 0-th byte of one word, that of the instruction ⑩ positioning on 2nd byte of one word, and that of the instruction ⑳ positions on the 1st byte of one word.

Figure 4:
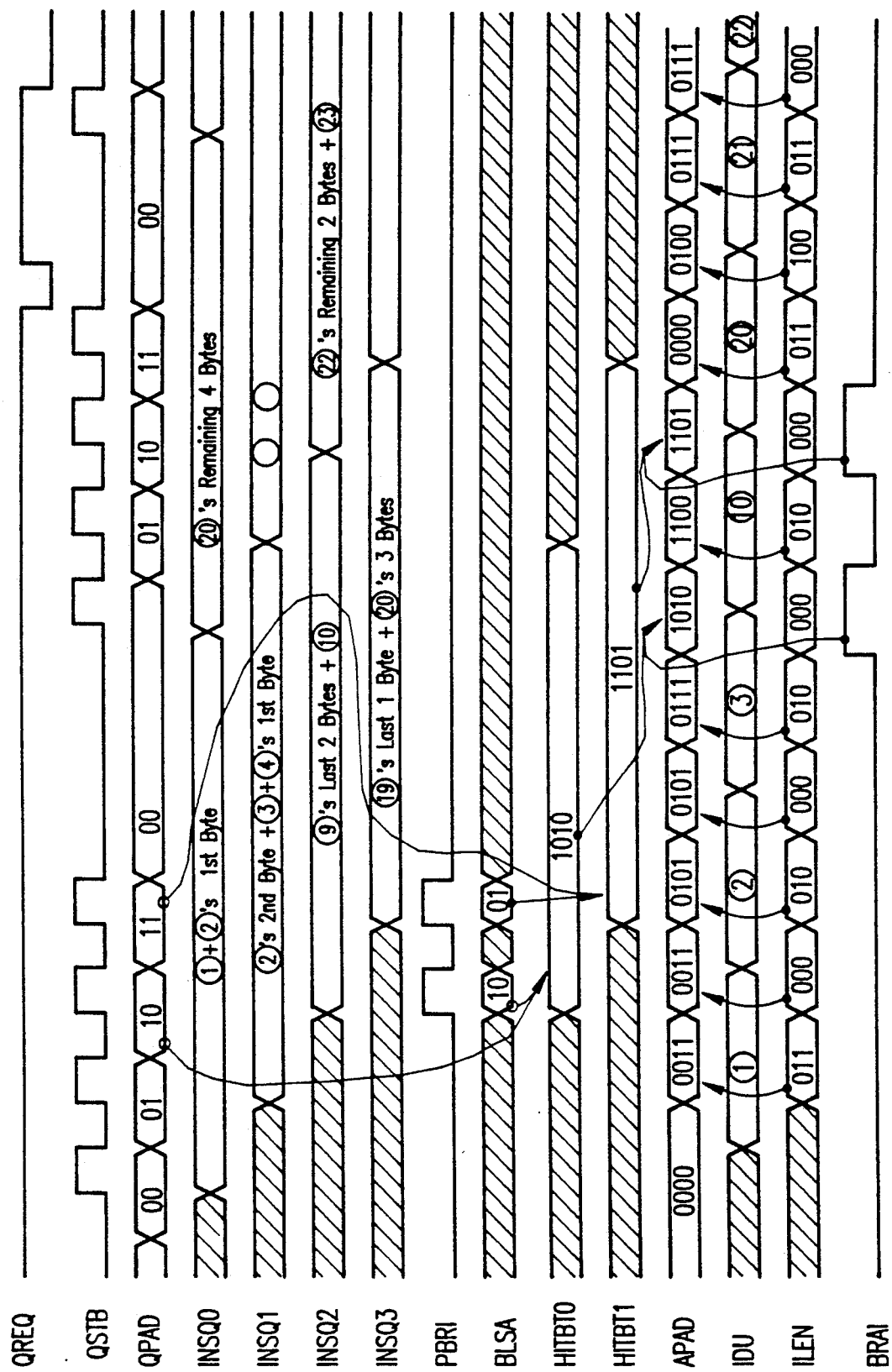
FIG. 4 is a timing chart representative of an operation of PFU shown in FIG. 2.

By the instruction prefetch operation using the address A1, the whole byte (3 bytes) of the instruction ① and the first byte of the instruction ② are fetched and then stored in the queue pocket INSQ0, as shown in FIG. 4. The prefetch address PADD is thereafter incremented and the queue pointer information is also updated to "01". The prefetch operation is performed by use of the incremented address, so that the remaining one byte (2nd byte) of the instruction ②, the whole byte (2 bytes) of the instruction ③ and the first byte of the instruction ④ (not shown in FIG. 3) are stored in the queue pocket INSQ1. At this time, the more significant bits of the prefetch address except the least significant two bits thereof are coincident with those of the address A3 of the branch instruction ③ stored in the branch prediction table 200, and therefore the table 200 produces and supplies the branch hit signal BHIT to the prefetch controller 203. The controller thereby reads out the branch address A10 from the table 200 and then sets it to the pointer 201. The prefetch operation using the branch address A10 is thereby initiated, so that the last two bytes of an instruction ⑨ (not shown in FIG. 3) just before the branch target instruction ⑩ and the whole byte of the instruction ⑩ are stored in the queue pocket INSQ2, as shown in FIG. 4. Since the branch target signal PBRI is generated, the least significant two bits of the branch address A10, "10", and the contents of the queue pointer 206, "10", are stored in the first buffer HITBT0 of the branch hit table 208 with the valid flag thereof being set logic 1 by the controller 207 (see FIG. 4). When the prefetch operation using the address A10 is performed, the branch prediction table 200 produces again the branch hit signal BHIT. In response thereto, the prefetch operation using the address A20 is thereafter performed, so that the last one byte of an instruction ⑲ (not shown in FIG. 3) and three bytes of the branch target instruction ⑳ are stored in the queue pocket INSQ3. The least significant two bits of the address A20, "01", and the contents of the queue pointer 206, "11", are written into the buffer HITBT1 along with the valid flag, as shown in FIG. 4.

On the other hand, since the output APAD of the aligner pointer 211 is zero ("000"), the aligner 213 selects and supplies the 4-byte data of the pocket INSQ0 to IDU 3. The instruction ① is thereby decoded by IDU 3. Since the instruction ① is of a 3-byte instruction, IDU 3 recognizes that the last byte of the selected 4-byte data, i.e. the first byte of the instruction ②, does not belong to the instruction ①, and thus disregards it. The instruction length information ILEN takes a value of 3, "011". The output APAD of the aligner controller 211 is thereby changed to "0011", as shown in FIG. 4. Since a certain instruction such as the instruction ⑳ has a byte length more than 4-byte, IDU 3 produces the instruction length information ILEN at least two times during the decoding operation of one instruction in order to get the whole byte thereof. In the case of the instruction ①, the whole byte thereof is supplied simultaneously to IDU 3, the information ILEN which has produced the second time takes zero ("0000"). The aligning pointer information APAD therefore does not change, so that the aligner 213 continues to output the whole byte (2 bytes) of the instruction ② and the whole byte (2 bytes) of the instruction ③. After completion of decoding the instruction ②, IDU 3 introduces the output of the aligner 213 to initiate the decoding operation of the next instruction. Since the instruction ② is of a 2-byte, data of the instruction ③ are disregarded during this decoding operation. Similarly to the case of the instruction ①, the aligner pointer 211 is controlled to output the information APAD of "0101". The whole byte of the instruction ③, the first byte of the instruction ④ and the last one byte of the instruction ⑨ are thereby outputted through the aligner 213.

Since the instruction ③ is of a 2-byte, the length information ILEN takes a value of "010", so that the aligning pointer data APAD is changed to "0111". However, the instruction ③ is a branch instruction, and hence the signal BRAI changes the high level during the second production of the length data ILEN, as shown in FIG. 4. As a result, the branch hit information BHTI of the buffer HITBT0, "1010", is set into the aligner pointer 211. The whole byte of the instruction ⑩, the last byte of the instruction ⑲ and the first byte of the instruction ⑳ are thereby selected and outputted to IDU 3 through the aligner 213. When IDU 3 starts to decode the instruction ⑩, the signal BRAI changes to the low level, so that the data of the buffer HITBT0 is invalidated by the controller 207. Similarly, the branch hit information of the buffer HITBT1, "1101", is set in the aligner pointer 211 during the decoding operation of the branch instruction ⑩. The three bytes of the instruction ⑳ and a meaningless one byte data are thus outputted through the aligner 213. When IDU 3 starts to decode the instruction ⑳, it produces the length information ILEN of a value of 3 ("011") to change the aligning pointer data 211 to "0000".

During the decoding operation described above, the instruction prefetch operation proceeds, so that the remaining four bytes of the instruction ⑳ are stored in the queue pocket INSQ0, as shown in FIG. 4. The whole byte (3 bytes) of the instruction 21 and the first byte of the instruction ㉒ are stored in the pocket INSQ1. The remaining two bytes of the instruction ㉒ and two bytes of a next instruction ㉓ (not shown in FIG. 3) are stored in the pocket INSQ1.

Since content of the aligner pointer 211 changes again to "0000", the remaining four bytes of the instruction ⑳ are supplied to IDU 3. The length data ILEN of "1000" is thereby produced to change the content of the pointer 211 to "0100". The instruction ㉑ thus starts to be decoded.

As described above, even when the branch hit state occurs successively and each of the branch target instructions has the leading byte not corresponding to the word boundary, the decoding operation of IDU 3 is never suspended, resulting in no distarbance in the pipelined processing operation. Since the branch hit table 208 has four buffers HITBT0-3, the microprocessor 100 supports four times occurrence of the branch hit state.

Figure 5:
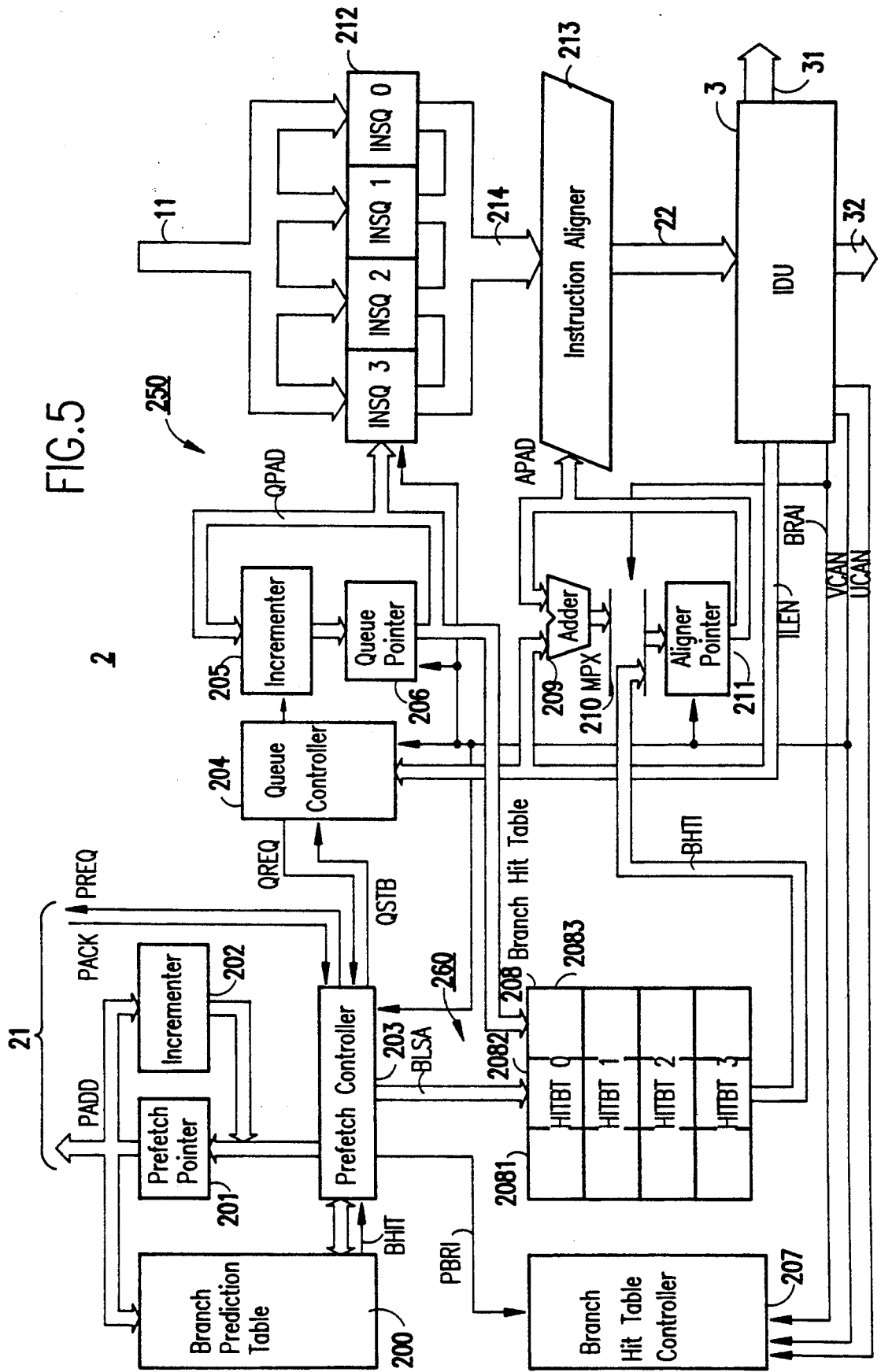
FIG. 5 is an internal block diagram representative of PFU according to another embodiment of the present invention.

Referring to FIG. 5, there is shown an internal block diagram of PFO according to another embodiment of the present invention, in which the same constituents as those shown in FIG. 2 are denoted by the same reference numerals to omit the further description thereof. This embodiment is constructed to perform a branch prediction operation of conditional branch instructions. The prefetch controller 203 includes a set of address registers 2031 for storing an address which is used when a branch is not taken due to the fact that the branch condition designated by the conditional branch instruction is not satisfied. Whether or not the branch condition is satisfied is indicated by IDU 3 through the signals VCAN and UCAN. The signal VCAN takes the active high level when the branch condition is not satisfied, i.e. when the branch is decided to be not taken, whereas the signal UCAN takes the active high level when the branch condition is satisfied. These signals VCAN and UCAN are supplied to the branch hit table controller 207. The signal VCAN is further supplied to the pointers 206 and 211 and the instruction queue 212 to reset all the contents thereof and further to the queue controller 204 and the prefetch controller 203.

Figure 6:
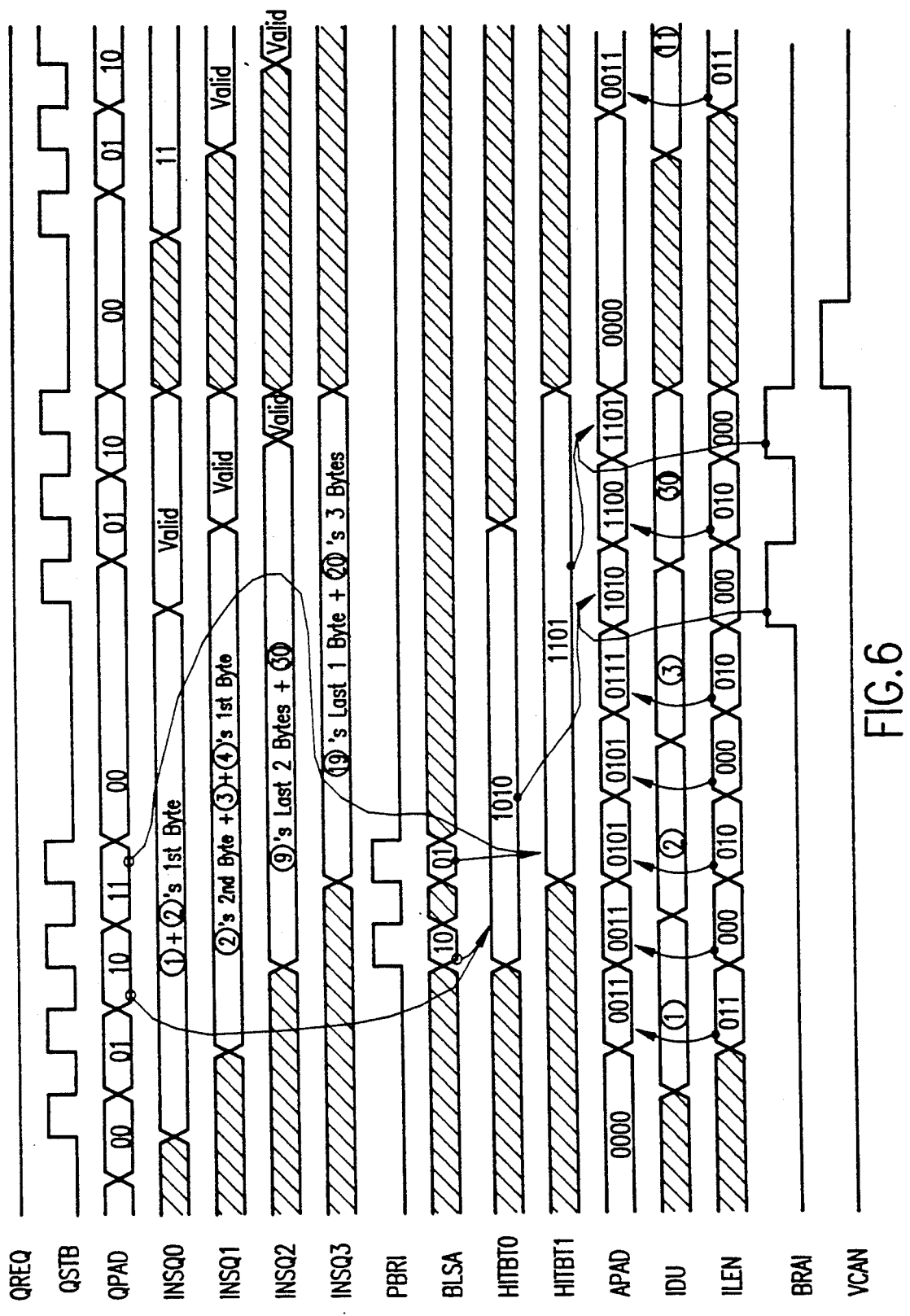
FIG. 6 is a timing chart representative of an operation of PFU shown in FIG. 5.

An operation will be described below with reference to FIGS. 5 and 6 by way of example of the instruction stream shown in FIG. 3. However, note that the instruction ⑩ is modified from the unconditional branch instruction to a conditional branch instruction㉚. The instruction ③ is of an unconditional branch type similarly to the first embodiment.

In the case where the branch condition designated by the conditional branch instruction ㉚ is satisfied, the signal UCAN is generated, so that the substantial same operations shown in FIG. 4 are obtained.

On the other hand, if the branch condition of the conditional branch instruction ㉚ is not satisfied, the signal VCAN is generated at the end of the decoding operation of the instruction㉚. Accordingly, the pointers 206 and 211 are reset to zero and the instruction queue 212 is cleared as shown in FIG. 5. The queue controller 204 responds to the signal VCAN to supply IDU 3 with a signal QEMP representing that all the pockets INSQ0-3 of the instruction queue 212 are empty. The operation of IDU 3 is thereby suspended. The prefetch controller 203 stores in the address register 2031 the incremented address of the branch address A10. The generation of the signal VCAN indicates that the microprocessor requires to execution instructions subsequent to the conditional branch instruction㉚. Therefore, the controller 203 sets the content of the register 2031 to the prefetch pointer 201 and issues the instruction prefetch request. Thus, the instruction⑪ subsequent to the instruction ㉚ is stored in the queue pocket INSQ0 and then supplied to IDU 3 through the aligner 213, as shown in FIG. 6.

It is apparent that the present invention is not limited to the above embodiments but may be modified and changed without departing from the scope and spirit of the invention.

What is claimed is:

1. A method of prefetching instructions for a microprocessor including the steps of
   a. prefetching sequential ones of a plurality of instructions including at least one branch instruction, said branch instruction including a branch target address, wherein said prefetched instructions are stored by words within a queue,
   b. storing a plurality of branch target addresses in a branch prediction table, each branch target address being associated with a branch instruction in said branch prediction table,
   c. accessing said branch prediction table at least when a branch instruction is prefetched from a memory,
   d. retrieving a branch target address associated with said branch instruction
   e. sending an acknowledgement of the prefetch from said memory when said branch instruction has been prefetched,
   f. prefetching an instruction at said branch target address in response to said acknowledgement,
   g. storing at least one least significant bit of an address of a branch instruction in association with an address within said queue containing said branch instruction, and
   h. determining a beginning byte of said branch target instruction within a word in said queue in response to said at least one least significant bit.

2. A method as recited in claim 1, including the further step of repeating steps c.-h. when said instruction at said branch target address is a branch instruction.

3. A method as recited in claim 1, said method including the further steps of storing at least one least significant bit of an address of each of a plurality of branch instructions in a first in-first out buffer in association with an address within said queue containing said branch instruction, and determining a beginning byte of said branch target instruction within a word in said queue in response to said at least one least significant bit.

4. A microprocessor having a branch prediction function in which an instruction prefetch operation for prefetching a branch target instruction responsive to a branch instruction is performed successively to an instruction prefetch operation for said branch instruction, said microprocessor including a first buffer means for temporarily storing, in a queue, prefetched instruction data, including said branch target instruction, decoder means for decoding instruction data supplied thereto, second buffer means including a plurality of areas storing less significant bit data of address information as aligning information for said branch target instruction within said queue, means responsive to said branch instruction being supplied to said decoder means for changing said aligning information in accordance with said less significant bit data stored in an area of said second buffer means corresponding to said branch instruction, and aligner means coupled between said first buffer means and said decoder means for supplying a part of the instruction data stored in said first buffer means to said decoder means in response to said aligning information.

5. A microprocessor as recited in claim 4, further including an instruction prefetch controller, a branch prediction table, said branch prediction table storing a branch target address associated with at least one branch instruction, means for receiving an acknowledgement of a prefetch of at least a branch instruction from memory, and means responsive to said acknowledgement of a prefetch of said at least one branch instruction for prefetching an instruction at said branch target address.

6. A microprocessor as recited in claim 5, wherein said means responsive to a prefetch of said at least one branching instruction is responsive to a further acknowledgement of a prefetch of a further branch instruction when a branch instruction is found at said branch target address.

7. A microprocessor as recited in claim 5, wherein said microprocessor further includes an instruction decoder and wherein said instruction prefetch controller includes a register for storing an address sequentially following an address to be prefetched, and wherein said microprocessor further includes means responsive to said instruction decoder for prefetching an instruction at the address contained in said register when said instruction decoder determines that a branch instruction is a conditional branch instruction and a condition specified in said conditional branch instruction is not satisfied.

8. A microprocessor as recited in claim 6, wherein said microprocessor further includes an instruction decoder and wherein said instruction prefetch controller includes a register for storing an address sequentially following an address to be prefetched, and wherein said microprocessor further includes means responsive to said instruction decoder for prefetching an instruction at the address contained in said register when said instruction decoder determines that a branch instruction is a conditional branch instruction and a condition specified in said conditional branch instruction is not satisfied.

* * * * *